UNITED STATES PATENT OFFICE.

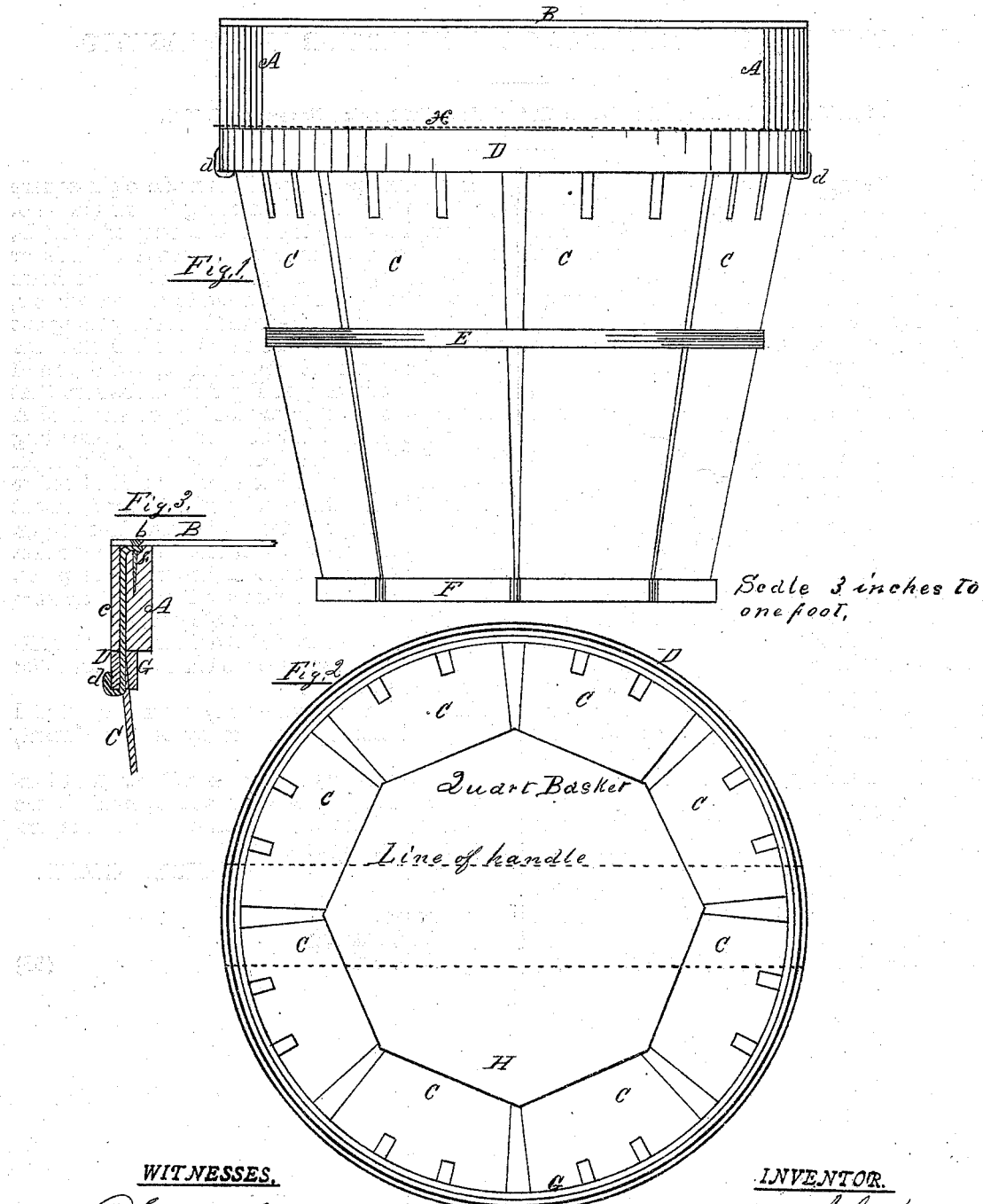

JOSEPH KNAPP, OF COLOMA, MICHIGAN.

IMPROVEMENT IN PLATFORMS OR HANDLES FOR FRUIT-BASKETS.

Specification forming part of Letters Patent No. 121,054, dated November 21, 1871.

*To all whom it may concern:*

Be it known that I, JOSEPH KNAPP, of Coloma, in the county of Berrien and State of Michigan, have invented an Improved Fruit-Basket, of which the following is a specification:

The present invention relates to an improved fruit-basket, which is designed to be used in transporting fruit; and its nature consists in a removable platform or support so arranged that it may be conveniently fastened to any ordinary fruit-basket, and, in part, hold the netting in place over the fruit, while, at the same time, it serves as a support to another basket on top for transportation, shipment, &c.

The advantage of this improvement is that it is not in the way of nesting the baskets when they are to be shipped from the factory to fruit districts. The baskets in such case are supplied with the improvement at any time when needed. Therefore it is not necessary that the attachment should be made at the basket-factory, but it can be made near where the fruit is to be packed, and put on at the time the netting is used or at any time before shipment, after which the attachment can be removed so as to re-nest the baskets and return them, which cannot be done when the platform is permanently fixed to the basket, as is usually the case.

In the drawing, Figure 1 is an elevation of the improved basket as it is arranged with the handle for use; Fig. 2, a top or plan view of the basket, with the handle removed; Fig. 3, a sectional elevation of the handle, showing how it is made and fastened to the basket.

C D E F represents an ordinary fruit-basket, except that the bottom H is made eight-square for the convenience of fastening the standards C. The handle consists of a thin strip of stuff, B, fastened to standards A by means of nails or screws $b$, Fig. 3. These standards have holes made vertically through them to receive wires $c$, which hold the handle to the basket by being put through the rim between the bands D C, and then bent upward around the lower part of the band D. In the drawing, at Fig. 3, it will be seen that the wire $c$ is clinched on the top of standard A before the strip B is nailed on, thus preventing the wire from being lost or getting loose. In practical use the basket should be filled before the handle is attached, by which arrangement the netting represented by dotted lines $x$, Fig. 1, can be put over the fruit and the standard set upon it, so as to assist in holding it in place. The lower end of the wire $c$ is then bent upward and the basket is ready for shipment.

I disclaim the elevated platform as such of itself, it having been used before to sustain other baskets in shipment.

Having thus described my invention, what I claim, and desire to secure by Letters Patent, is—

A removable platform or handle for fruit-baskets, consisting of the parts A B, held to the basket by wires $c$ so as to in part hold the netting in place, as set forth.

JOSEPH KNAPP.

Witnesses:
   J. H. MARVIN,
   F. L. BEE.